May 7, 1963   J. J. SEAQUIST   3,089,112
ROTARY CURRENT INTERCHANGE STRUCTURE
Filed July 15, 1960   2 Sheets-Sheet 1

INVENTOR.
JAMES J. SEAQUIST
BY
Fred Wiviott
ATTORNEY

May 7, 1963　　　J. J. SEAQUIST　　　3,089,112
ROTARY CURRENT INTERCHANGE STRUCTURE
Filed July 15, 1960　　　　　　　　　　　2 Sheets-Sheet 2

INVENTOR.
JAMES J. SEAQUIST
BY
Fred Wiviott
ATTORNEY

United States Patent Office 3,089,112
Patented May 7, 1963

3,089,112
ROTARY CURRENT INTERCHANGE STRUCTURE
James J. Seaquist, West Allis, Wis., assignor to McGraw-Edison Company, Milwaukee, Wis., a corporation of Delaware
Filed July 15, 1960, Ser. No. 43,139
7 Claims. (Cl. 339—5)

This invention relates to current interchange structure and, more particularly, to means for transferring current between relatively rotatable members.

It is an object of the invention to provide new and improved current interchange structure.

Another object of the invention is to provide means for transferring current through a bearing which rotatably supports a conductive shaft member.

A further object of the invention is to provide current interchange structure which facilitates current transfer and reduces the friction between relatively rotatable members.

A still further object of the invention is to provide current interchange structure utilizing a plurality of current interchange springs confined in a relatively limited space and in which sealing against contamination is greatly facilitated.

These and other objects and advantages of the invention will become more apparent from the detailed description of the invention taken in view of the accompanying drawings in which.

In general terms, the invention comprises a first substantially cylindrical conductive member and a second conductive member having a circular opening for receiving said first member in spaced relation. An annular channel is formed in one of said members and surface means is formed on the other which has portions facing the corners of said channel to form therewith a pair of parallel annular cavities between said members which are characterized by a pair of divergent sidewalls. A helically wound conductive current interchange spring is disposed in each cavity and has a helical diameter greater than the effective distance between said members so that its convolutions are forced to lie over in the same direction relative to its helical axis. In this manner, the resiliency of the conductive members normally hold the convolutions in firm frictional contact with each of the surfaces and also resiliently supports the ring member away from the central conductive member so that the relative rotation of the members is facilitated. In addition, the structure may include complementary grooves in the ring member and the central member for receiving ball bearings to facilitate the relative rotation between the members.

Figure 1:
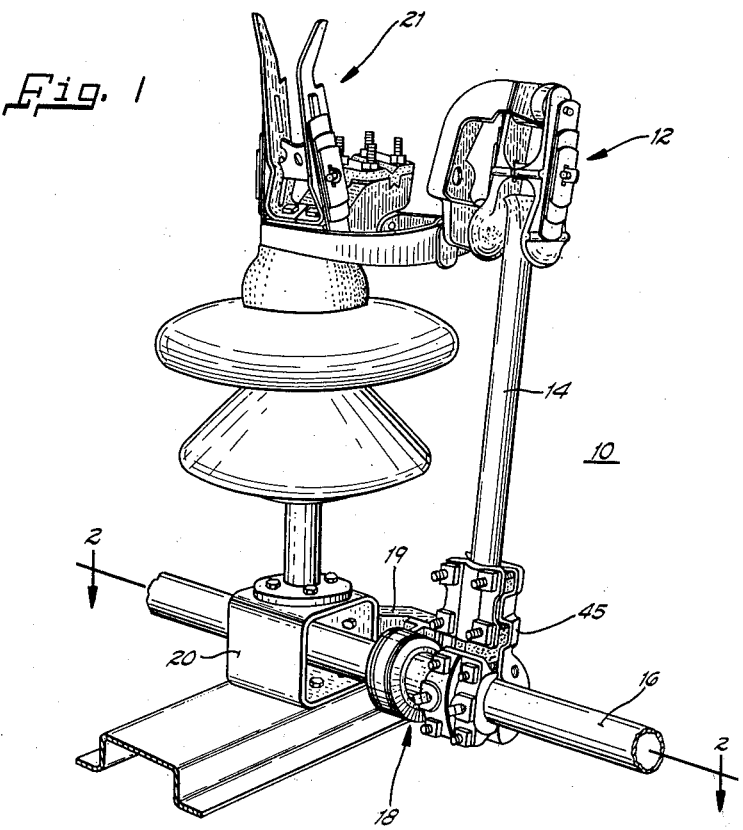
FIG. 1 shows an electrical switch in which the current interchange structure according to the instant invention may be utilized.

Referring now to the drawings in greater detail, FIG. 1 shows a grounding switch 10 which is illustrative of one type of electrical apparatus in which the current interchange structure according to the instant invention is usable. Switch 10 includes a stationary contact 12 and a switch blade 14 which is affixed to an operating shaft 16 journaled for rotation in a current interchange and bearing assembly 18. Assembly 18 is affixed to a support bracket 19 which is secured to the supporting structure 20 upon which the apparatus is mounted. For purposes of illustration, the grounding switch 10 is shown with its stationary contact 12 electrically and mechanically connected to the stationary contact jaw 21 of an air disconnect switch of the type disclosed in Patent 2,830,144 to T. A. Fjellstedt and assigned to the assignee of the instant invention. It will be appreciated that when switch 10 is closed, a path to ground from contact jaw 21 is provided through stationary contact 12, switch blade 14, operating shaft 16, current interchange bearing structure 18, bracket member 19 and support structure 20. Operation of the grounding switch 10 is accomplished by driving means (not shown) which is operable to rotate shaft 16 in bearing structure 18 and thereby pivoting switch blade 14 into and out of engagement with the stationary contacts 12.

Figure 4:
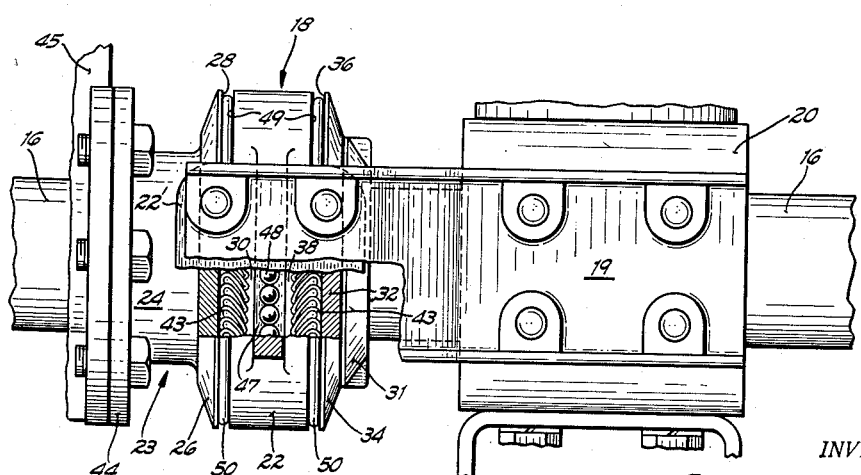
FIG. 4 is a rear view with parts broken away showing the preferred embodiment of the invention.
Figure 2:
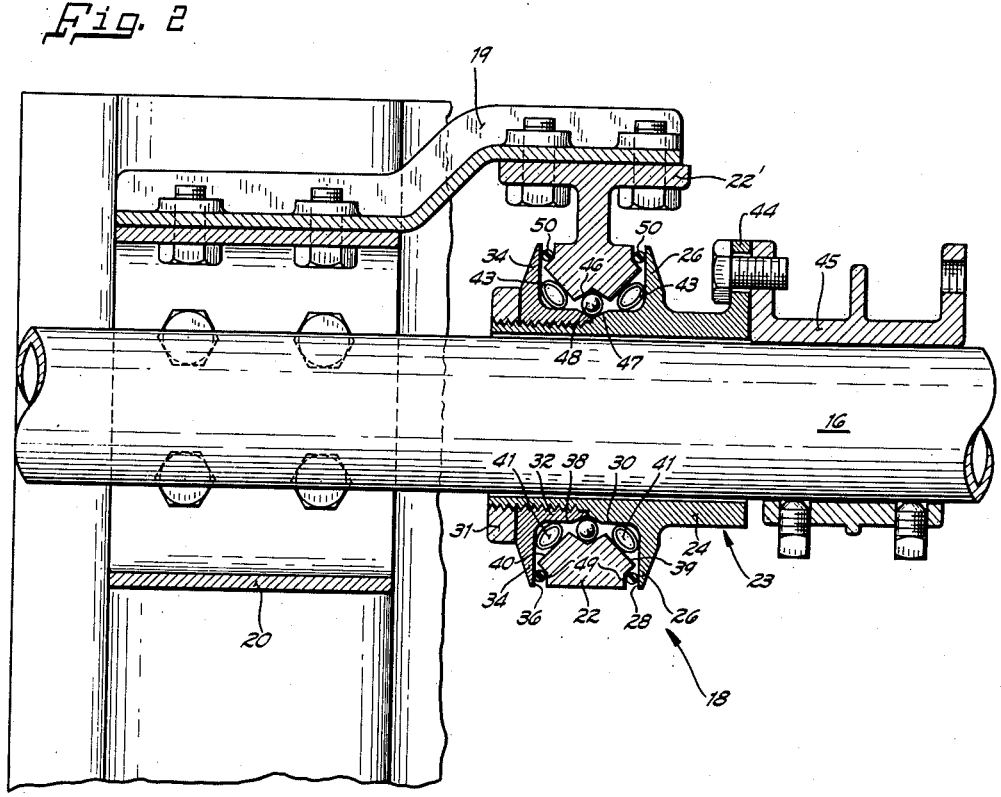
FIG. 2 is a view taken along lines 2—2 of FIG. 1.
Figure 3:
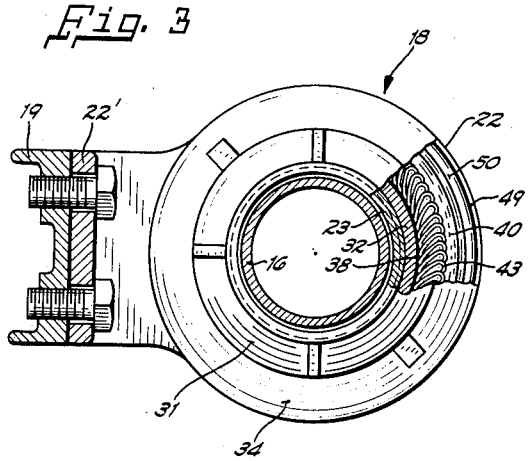
FIG. 3 is a side view with parts broken away of the current interchange structure shown in FIG. 2.

Referring to FIGS. 2, 3 and 4, the bearing and current interchange structure 18 is shown to include a stationary portion comprising a ring member 22 secured to the support member 20 by an integral bracket portion 22′ and a movable sleeve assembly 23 affixed to the switch blade 14. Sleeve assembly 23 includes a first sleeve member 24 slidably received on operating shaft 16 and which has a radially extending annular flange 26 whose inner surface 28 is substantially perpendicular to the lateral surface 30 of sleeve member 24. Threadably mounted on the end of sleeve member 24 opposite surface 28 and secured thereon by a lock nut 31 is a second sleeve member 32 which is also provided with a radially extending flange 34 whose inner surface 36 is substantially perpendicular to the lateral surface 38 of second sleeve member 32. As a result, sleeve members 24 and 32 cooperate to form a unitary rotatable sleeve assembly 23 having an annular U-shaped channel formed by surfaces 28, 30, 36 and 38.

Ring member 22 is concentrically disposed relative to sleeve assembly 23 and between flanges 26 and 34. A pair of divergent surfaces 39 and 40 are formed on the axial sides of ring 22 and extend outwardly from its center so that they are presented toward the junctures between surfaces 28 and 30 and between surfaces 36 and 38 respectively. This provides a pair of parallelly disposed, annular, triangular-in-cross-section cavities or gaps 41 between the stationary ring member 22 and the rotatable sleeve assembly 23.

Disposed in each of the cavities 41 is a helically wound conductive spring member 43 having a greater outside helical diameter than the effective distances between ring member 22 and sleeve assembly 23 across cavities 41 so that all convolutions of springs 43 are forced to lie over in the same direction relative to its helical axis. As a result, the inclined convolutions obtained their contact bearing pressure from their tendency to straighten out or to assume their unstressed shape. Because each of the current interchange springs 43 contacts its associated sleeve members 24 and 32 at two points, i.e., at surfaces 28—30 and 36—38 respectively, a parallel current path is achieved through each of the spring convolutions. Current transfer, therefore, is effected through a large number of parallel paths through the spring convolutions from the surfaces 39 and 40 of the ring member 22 to the surfaces 28—30 and 36—38 of the sleeve assembly 23. As a result of this large number of parallel current paths between sleeve assembly 23 and ring member 22, very low resistance current interchange is achieved.

A bracket 44 integral with sleeve member 24 and extending radially therefrom is suitably secured to the base 45 of switch blade 14. Base 45 is in turn rigidly affixed to operating shaft 16 so that a rigid driving connection is achieved between operating shaft 16 and sleeve assembly 23.

As shown in FIG. 2, opposed grooves 46 and 47 are formed in the center of ring member 22 and sleeve assembly 23 to provide races for ball bearings 48. As a result, rolling friction is provided between the ring member 22 and sleeve assembly 23. The large number of parallel current paths provided by springs 43 allows the contact pressure of each individual convolution to be relatively small so that the rotation of operating shaft 16 is not impeded by a large frictional force.

In addition to transferring current between ring member 22 and sleeve assembly 23, current interchange springs 43 also perform the function of resiliently supporting ring member 22 and sleeve assembly 23 in the proper spaced relation. This results from the fact that each of the springs 43 exert a first component of force radially from sleeve assembly 23 to hold ring member 22 concentrically spaced therefrom. In addition, a second axial component of force is exerted by each current interchange spring 43 inwardly toward the center of ring 22 which tends to hold the sides of ring 22 spaced from surfaces 28 and 36.

Annular recesses 49 are formed in each of the outer axial corners of ring member 22 for receiving ring gaskets 50 whereby the interior of the assembly is sealed against contamination.

Although the invention is shown in connection with grounding switch 10, it will be appreciated that it has application in other types of electrical apparatus as well. In addition, while only a single embodiment of the invention has been shown and described other modifications will become apparent to those skilled in the art once the inventive concept is known. Accordingly, it is intended to cover in the appended claims all such applications and modifications that fall within the true spirit of the invention.

I claim:

1. Current interchange structure comprising first and second conductive members, said first conductive member being substantially cylindrical, said second conductive member having a circular opening for receiving said first conductive member in spaced relation, an annular channel formed in one of said conductive members and having a pair of generally laterally extending sidewalls and a bottom surface, the other conductive member having a pair of oblique surfaces, one of said oblique surfaces being formed in each of the axial sides of said other conductive member and opposite the intersections of each of the sidewalls and the lower surface of said channel and spaced therefrom to provide a pair of spaced apart, substantially parallel, annular gaps between said conductive members which are characterized by a substantially triangular cross section, a helically wound conductive current interchange spring member disposed in each of said gaps, the effective distance between said conductive members across said gaps being less than the height of said spring members so that the convolutions of each are inclined in the same direction relative to its helical axis whereby the resiliency of said spring members holds said convolutions in uniformly advancing spiral relation with each other and maintains them in firm frictional contact with said members.

2. Current interchange structure comprising a substantially cylindrical conductive member having an annular channel provided thereon, a second annular conductive member having a portion disposed in said channel, surface means formed on said portion and spaced from said channel to form therewith a pair of substantially parallel annular cavities between said conductive members which are characterized by a pair of divergent sidewalls, a helically wound conductive current interchange spring member disposed in one of said cavities, the depth of said one of said cavities being less than the convolutional diameter of said spring member so that its convolutions are inclined in the same direction relative to its helical axis, whereby the resiliency of said spring member holds said convolutions in uniformly advancing spiral relation with each other and maintains them in firm frictional contact with said members, the resiliency of said helically wound member also maintaining said conductive members in uniformly spaced apart relation, and ball bearing means disposed in said other cavity for cooperating with said spring member to support said conductive members in low frictional spaced relation.

3. Current interchange structure comprising a substantially cylindrical conductive member having an annular channel provided thereon, a second annular conductive member having a portion disposed in said channel, surface means formed on said portion and spaced from said channel to form therewith a pair of substantially parallel annular cavities between said conductive members which are characterized by a pair of divergent sidewalls, a first helically wound conductive current interchange spring member disposed in one of said cavities, the depth of said one of said cavities being less than the convolutional diameter of said spring member so that its convolutions are inclined in the same direction relative to its helical axis, whereby the resiliency of said spring member holds said convolutions in uniformly advancing spiral relation with each other and maintains them in firm frictional contact with said members, the resiliency of said helically wound member also maintaining said conductive members in uniformly spaced apart relation, and a second helically wound conductive current interchange spring member disposed in the other of said cavities for co-operating with said first spring member to support said conductive members in low frictional spaced relation, said second spring member having a convolutional diameter which is greater than the depth of its associated cavity so that its convolutions are each inclined in the same direction relative to its helical axis, whereby the resiliency of said spring member holds its convolutions in uniformly advancing spiral relation with each other and maintains them in firm frictional contact with said members.

4. Current interchange structure comprising a substantially cylindrical conductive member having an annular channel formed therein, said channel having a pair of generally laterally extending sidewalls and a bottom surface, a second annular conductive member disposed in said channel and having an oblique surface formed in each of the axial sides thereof and opposite the intersections of each of the sidewalls and the lower surface of said channel and spaced therefrom to provide a pair of spaced apart parallel annular cavities between said conductive members which are characterized by a substantially triangular cross-section, a helically wound conductive current interchange spring disposed in each of said cavities, the depth of said cavities being less than the convolutional diameter of said spring members so that the convolutions of each are inclined in the same direction relative to its helical axis whereby the resiliency of said spring members holds said convolutions in uniformly advancing spiral relation with each other and maintains them in firm frictional contact with said members, the resiliency of said spring member also maintaining said conductive members in spaced apart relation, each of said spring members contacting one of the sidewalls and the bottom surface of said channel so that parallel current paths are provided through each convolution.

5. Current interchange structure comprising a substantially cylindrical conductive member having an annular U-shaped channel formed therein, a second annular conductive member disposed in said groove and having a frusto-conical surface formed opposite each of the corners of said groove and spaced therefrom to form a pair of spaced apart parallel annular cavities between said conductive members which are characterized by a substantially triangular cross-section, a helically wound conductive current interchange spring member disposed in each of said cavities, the depth of said cavities being less than the convolutional diameter of said spring members so that the convolutions of each are inclined in the same direction relative to its helical axis whereby the resiliency of said spring members holds said convolutions in uniformly advancing spiral relation with each other and maintains them in firm frictional contact with said members, the resiliency of said spring member also maintaining said conductive members in spaced apart relation, and ball bearing means disposed between said conductive members.

6. Current interchange structure comprising an internal and an external conductive member disposed in concentric spaced relation and connected for relatively rotational movement, one of said members having means for providing an annular channel whose open side is disposed toward the other member, said channel having a pair of generally laterally extending sidewalls and a bottom surface, the other conductive member having a pair of oblique surfaces, said oblique surfaces being in axial spaced relation and each being disposed opposite the intersection of one of said sidewalls and said bottom surface and spaced therefrom to form therewith a pair of substantially parallel annular cavities between said conductive members which are characterized by a pair of divergent sidewalls, a helically wound conductive current interchange spring member disposed in each of said cavities, the effective distances between said conductive members across said cavities being less than the outside helical diameter of said spring members so that the convolutions of each are inclined relative to its helical axis whereby the resiliency of said spring members hold said convolutions in uniformly advancing spiral relation with each other and maintains them in firm electrical contact with said members.

7. Current interchange structure comprising an internal and an external conductive member disposed in concentric spaced relation and connected for relatively rotational movement, one of said conductive members having a pair of axially spaced apart surfaces formed thereon and extending obliquely from the axis of rotation and facing said other conductive member, said other conductive member having a pair of cavity means provided thereon which face said oblique surfaces, said cavity means being defined by a pair of laterally extending axially spaced apart surfaces and surface means extending in a generally axial direction and intersecting said axially spaced apart surfaces to provide with said oblique surfaces a pair of axially spaced apart, substantially parallel annular cavities between said conductive members, a helically wound conductive current interchange spring member disposed in each of said cavities, the effective distance between said conductive members across said cavities being less than the outside helical diameter of said spring members so that the convolutions of each are inclined relative to its helical axis whereby the resiliency of said spring members holds said convolutions in uniformly advancing spiral relation with each other and maintain them in firm electrical contact with said members.

References Cited in the file of this patent

UNITED STATES PATENTS

| | | |
|---|---|---|
| 1,873,042 | Rohrdanz | Aug. 23, 1932 |
| 2,283,940 | Morris | May 26, 1942 |

FOREIGN PATENTS

| | | |
|---|---|---|
| 186,526 | Great Britain | Oct. 5, 1922 |
| 774,419 | Great Britain | Mar. 8, 1957 |